UNITED STATES PATENT OFFICE.

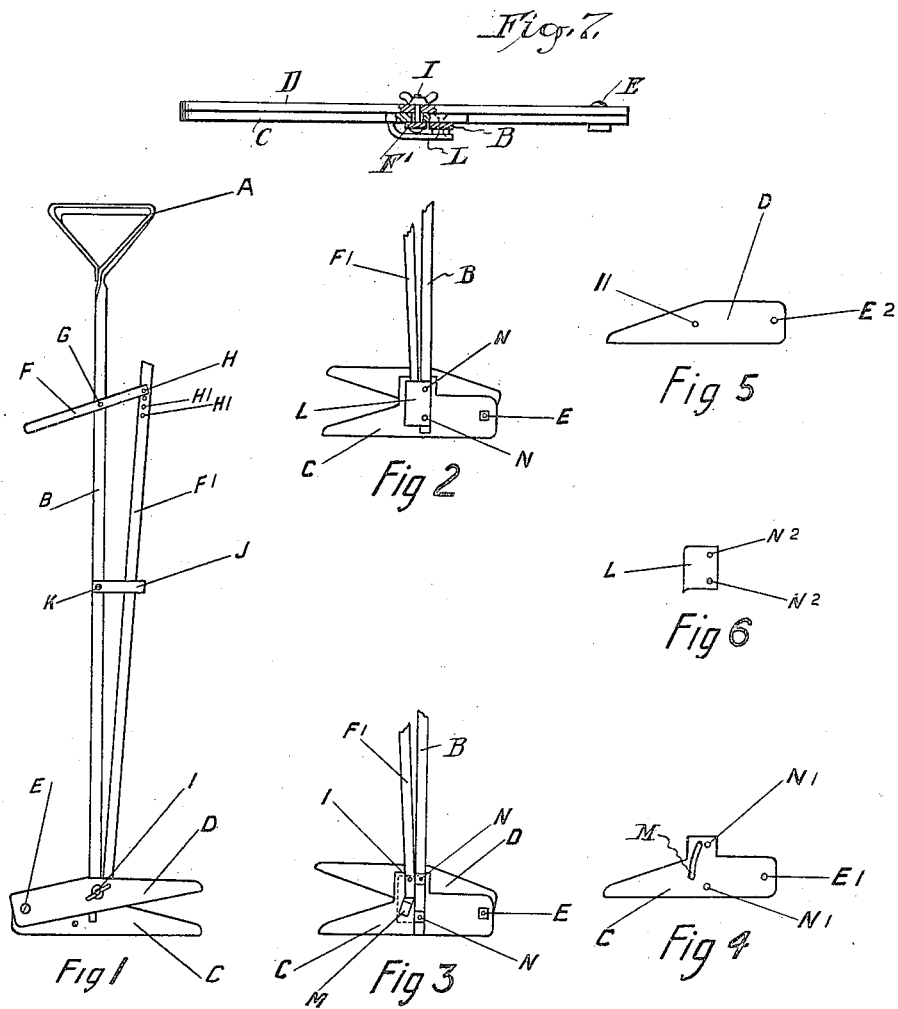

THOMAS CORROW, OF SWAMPSCOTT, MASSACHUSETTS.

LAWN-TRIMMING DEVICE.

1,372,670.

Specification of Letters Patent. Patented Mar. 29, 1921.

Application filed September 9, 1919. Serial No. 322,683.

*To all whom it may concern:*

Be it known that I, THOMAS CORROW, a citizen of the United States, residing at Swampscott, in the county of Essex and State of Massachusetts, have invented certain new and useful Improvements in Lawn-Trimming Devices, of which the following is a specification.

My invention relates to devices for trimming the edges of lawns and is intended for use where the grass grows adjacent to fences or walls where it is difficult to reach by the use of the ordinary grass shears. My device will also be appreciated by those who desire to trim the edges of lawns adjacent to walks or driveways without necessity of the operator kneeling down while doing the trimming.

The objects of my invention are, to provide an inexpensive yet efficient method of operating grass shears at a distance from the blades, to avoid the necessity of being in a kneeling or stooping position while the grass shears are being operated, to provide a simple yet efficient means of preventing the clogging of the shears while they are being operated, and to provide other advantages and results some of which may be hereinafter referred to in the following specification.

I attain the objects of my invention as illustrated in the accompanying drawing in which Figure 1 shows a side view of my invention; Fig. 2 shows a view of the other side of the blade portion of my device; Fig. 3 shows the same view as is shown in Fig. 2 except that the clog preventing plate, hereinafter referred to, is removed; Fig. 4 shows the lower cutting blade of my device; Fig. 5 shows the upper cutting blade of my device; Fig. 6 shows my clog preventing plate, and Fig. 7 is a top edge view of the blades having a portion broken away to show the pivot-pin, and also showing the handles in section.

Similar reference letters designate like parts in all of the figures of the drawings.

Referring to the drawings, A shows the handle of my device. B shows an extension of the handle leading from the handle A to the lower blade C, to the side of which it is rigidly fastened at right angles as shown in Figs. 2 and 3, so as to allow thereon no movement of the blade C. D shows my upper cutting blade which is fastened to the blade C by the pivot screw E. The blade D is operated by the lever handle F which is pivoted on to the upright B by the screw bolt G. In the connecting rod F1, I provide a series of openings H1, to which the handle F may be fastened by the screw H so as to give a varying position of the handle F in operation. The handle F is connected with the upper blade D by the connecting rod F1, which is in turn secured to the handle F by the screw bolt H, and to the blade D by the bolt I. Intermediate the ends of the handle extension B, I place a guard J through which the connecting rod F1 slides, said guard being fastened to the handle extension B by the screw K. The bolt I is fitted with a tension nut so as to make possible any desired adjustment of the blades.

In Fig. 2, L shows my clog preventing or cover plate.

In Fig. 3, M shows a slot in the blade C in which slides or operates that portion of the connecting screw I, lying between the rod F1, and the blade D. N shows the holding screws by means of which the handle extension B is securely fastened to the blade C so as to allow no movement of said blade upon the rod B.

Fig. 4 shows my lower cutting blade C as it appears before it is assembled with the other parts of my device. E1 shows the opening into and through which the hinge screw E passes. N1 shows the openings through which the fastening screws N pass.

Fig. 5 shows my upper cutting blade D as it appears before it is assembled with the other parts of my device. E2 shows the opening through which the pivot screw E passes when my device is assembled. I1 shows the opening through which passes the bolt I when the blade is assembled onto the operating rod F1.

In Fig. 6, N2 shows the openings in the cover plate L through which the fastening screws N pass when my device is assembled, said cover-plate being turned inwardly at its forward edge so that the inturned edge will engage the face of the blade C, whereby grass and other material will be prevented from entering the slot M to interfere with the operation of the rod F1.

It will be understood that in operating my device an up and down movement of the handle F exerting its influence upon the blade D through the rod F1 likewise gives an up and down movement to the blade D, thus giving a shear cutting effect to the blades C and D, whose flat sides are vertically disposed with the lower edge of the blade C arranged to rest upon and slide over the ground.

Having thus described my invention what I claim as new and desire to secure by Letters Patent of the United States is:

1. A device of the character described, comprising a guide-blade and a vertically reciprocating blade pivoted together at one end, a supporting handle secured to said guide-blade and extending upwardly therefrom and for holding said blade edgewise with respect to the ground, operating means for the reciprocating-blade also extending upwardly and operable from a point adjacent the upper end of the supporting handle, said operating means being connected to said reciprocating-blade by a pin extending through a vertical slot formed in the guide-blade.

2. A device of the character described, comprising a guide-blade and a vertically reciprocating blade pivoted together at one end, a supporting handle secured to said guide-blade and extending upwardly therefrom and for holding said blade edgewise with respect to the ground, operating means for the reciprocating blade also extending upwardly and operable from a point adjacent the upper end of the supporting handle, said operating means being connected to the reciprocating-blade by a pin extending through a vertical slot formed in the guide-blade, and a cover-plate mounted over said vertical slot in the guide-blade and provided with an inturned front edge adapted to lie adjacent to the outer surface of said guide-blade.

In testimony whereof I affix my signature in the presence of two witnesses.

THOMAS CORROW.

Witnesses:
MARION T. FRITZ,
A. GERTRUDE JOHNSON.